United States Patent
Suen et al.

(10) Patent No.: US 11,021,565 B2
(45) Date of Patent: Jun. 1, 2021

(54) SILANE MODIFIED POLYMERS AND USE OF THE SAME IN ADHESIVE COMPOSITIONS

(71) Applicants: Henkel IP & Holding GmbH, Duesseldorf (DE); Henkel AG & Co. KGaA, Duesseldorf (DE)

(72) Inventors: Wu Suen, Pennington, NJ (US); Andrea Keys Eodice, Hillsborough, NJ (US); Claudia Meckel-Jonas, Duesseldorf (DE); Christina Despotopoulou, Minneapolis, MN (US); Johann Klein, Duesseldorf (DE)

(73) Assignees: Henkel AG & Co. KGaA, Duesseldorf (DE); Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 15/929,486

(22) Filed: May 5, 2020

(65) Prior Publication Data
US 2020/0262966 A1 Aug. 20, 2020

Related U.S. Application Data

(63) Continuation of application No. PCT/US2018/059548, filed on Nov. 7, 2018.

(60) Provisional application No. 62/582,363, filed on Nov. 7, 2017, provisional application No. 62/754,756, filed on Nov. 2, 2018.

(51) Int. Cl.
| | |
|---|---|
| C08G 18/61 | (2006.01) |
| C08G 18/44 | (2006.01) |
| C08G 18/48 | (2006.01) |
| C08G 18/12 | (2006.01) |
| C08G 18/75 | (2006.01) |
| C09J 175/08 | (2006.01) |
| C08G 77/46 | (2006.01) |
| C08G 77/448 | (2006.01) |
| C08G 64/18 | (2006.01) |

(52) U.S. Cl.
CPC ............ *C08G 18/61* (2013.01); *C08G 18/12* (2013.01); *C08G 18/44* (2013.01); *C08G 18/4808* (2013.01); *C08G 18/4845* (2013.01); *C08G 18/4854* (2013.01); *C08G 18/755* (2013.01); *C08G 64/183* (2013.01); *C08G 64/186* (2013.01); *C08G 77/448* (2013.01); *C08G 77/46* (2013.01); *C09J 175/08* (2013.01)

(58) Field of Classification Search
CPC ...... C08G 77/42; C08G 77/46; C08G 77/448; C08G 64/183; C08G 64/186; C08G 81/00
See application file for complete search history.

(56) References Cited

U.S. PATENT DOCUMENTS

| | | | |
|---|---|---|---|
| 5,120,812 A * | 6/1992 | O'Lenick, Jr. ......... | C08G 18/61 528/25 |
| 6,197,912 B1 | 3/2001 | Huang et al. | |
| 7,057,001 B2 | 6/2006 | Bachon et al. | |
| 7,365,145 B2 | 4/2008 | Yang et al. | |
| 8,772,421 B2 | 7/2014 | Bachon et al. | |
| 9,657,144 B2 * | 5/2017 | Hubei ................ | C08G 18/7664 |
| 2005/0004324 A1 * | 1/2005 | Ward ................... | C08G 77/448 525/461 |
| 2007/0208144 A1 * | 9/2007 | Delsman ............. | C08G 77/448 525/394 |
| 2010/0120934 A1 * | 5/2010 | Behan ................. | C08G 77/388 521/154 |
| 2010/0207876 A1 | 8/2010 | Lin | |
| 2011/0071254 A1 * | 3/2011 | Bachon ............. | C08G 18/4854 524/588 |
| 2011/0166285 A1 | 7/2011 | Zander et al. | |
| 2012/0165493 A1 | 6/2012 | Stanjek et al. | |
| 2012/0219802 A1 * | 8/2012 | Hilgers .................. | C08G 18/44 428/412 |
| 2013/0245304 A1 | 9/2013 | Schubert et al. | |
| 2014/0155545 A1 | 6/2014 | Stanjek et al. | |
| 2015/0031806 A1 | 1/2015 | Lim et al. | |
| 2015/0274918 A1 | 1/2015 | Koecher et al. | |
| 2015/0166859 A1 | 6/2015 | Choffat et al. | |

FOREIGN PATENT DOCUMENTS

| | | |
|---|---|---|
| AU | 2016247149 A1 | 11/2016 |
| EP | 1396513 A1 | 3/2004 |
| EP | 1535940 A1 | 6/2005 |
| EP | 1373363 B1 | 8/2007 |
| EP | 1930376 A1 | 6/2008 |
| EP | 2785755 B1 | 1/2017 |
| WO | 2005047394 A1 | 5/2005 |
| WO | 2010063740 A1 | 6/2010 |
| WO | 2012146023 A1 | 11/2012 |
| WO | 2016064481 A1 | 4/2016 |
| WO | 2018029420 A1 | 2/2018 |

OTHER PUBLICATIONS

International Search Report for International PCT Patent Application No. PCT/US2018/059548 dated Feb. 20, 2019.

* cited by examiner

*Primary Examiner* — Marc S Zimmer
(74) *Attorney, Agent, or Firm* — James E. Piotrowski

(57) ABSTRACT

Disclosed is a moisture curable silane modified terpolymer comprising a polyether segment, a segment of polytetrahydrofuran or polycarbonate, a polysiloxane segment and terminal amino silane groups joined to the terpolymer via urethane linkages and wherein the polyether segment comprises at least 70% by weight based on the total weight of the silane modified terpolymer. Also disclosed is a method of forming moisture curable silane modified terpolymer.

20 Claims, No Drawings

SILANE MODIFIED POLYMERS AND USE OF THE SAME IN ADHESIVE COMPOSITIONS

TECHNICAL FIELD

This disclosure relates generally to adhesive compositions and more particularly to silane modified polymers (SMP) for use in curable adhesive compositions.

BACKGROUND OF THE INVENTION

This section provides background information which is not necessarily prior art to the inventive concepts associated with the present disclosure.

The present disclosure relates to the field of curable compositions, as used for example in adhesives, sealants and coating compositions. In particular, the disclosure relates to moisture curable compositions based on silane modified polymers, their use as an adhesive, sealant and/or coating material, and adhesive, sealant and/or coating materials comprising the moisture curable composition.

One-component, moisture-curing adhesives and sealants have for years played an important part in numerous technical applications. As well as the polyurethane adhesives and sealants with free isocyanate groups and the traditional silicone adhesives and sealants based on dimethylpolysiloxanes, there has recently also been increasing use of so-called silane modified adhesives and sealants. These adhesives are distinguished by a broad range of adhesion to a wide variety of substrates without any surface pretreatment such as using primers.

Polymer systems having reactive silyl groups are known in principle. In the presence of atmospheric moisture, polymers having silyl groups with hydrolyzable substituents are capable of condensing with one another at room temperature, splitting off the hydrolyzed residues. Depending on the concentration of silyl groups having hydrolyzable substituents and the structure of these silyl groups, mainly long-chain polymers (thermoplastics), relatively wide-mesh, three-dimensional networks (elastomers) or highly crosslinked systems (thermosets) are formed during this process. The polymers generally comprise an organic backbone which carries, for example, alkoxysilyl or acyloxysilyl groups at the ends. The organic backbone can be, for example, polyurethane, polyester, or polyether.

Polymers with silyl groups at the ends or in a side chain are described for example in EP 1 396 513 A1. The silyl groups having hydrolyzable substituents are introduced, according to this document, by addition of a hydrosilane to terminal double bonds of the backbone polymer, by reaction of isocyanatosilanes with hydroxyl groups of the polymer, by reaction of silanes comprising active hydrogen atoms with isocyanate-functionalized polymers or by reaction of mercaptosilanes with terminal double bonds of the polymer. The polymers are a component of compositions which are used as adhesives or sealants.

EP 1 535 940 A1 also describes a method for producing crosslinkable materials, wherein in a first step organyloxysilyl-terminated polymers are produced by reacting dihydroxy-terminated polymers with isocyanato-functional silanes and these are mixed in a second step with silane condensation catalyst and optionally further substances.

A curable composition based on silyl groups which can crosslink by siloxane bond formation is also provided by EP 1 930 376 A1, wherein an amine compound constituting a silanol condensation catalyst is listed as a further component.

A crosslinkable polymeric composition based on silane-terminated polymers having mixed oxyalkylene units in the polymer backbone is described in WO 2005/047394 A1.

WO 2010/063740 A1 discloses an adhesive or sealant comprising silylated polyurethanes, silylated polyureas, silylated polyethers, silylated polysulfides and silyl-terminated acrylates, as well as a cyclohexanepolycarboxylic acid derivative.

Other approaches have been identified to make a silane modified polymer that will provide improved adhesion for a final adhesive composition. One frequent drawback is that these approaches result in silane modified polymers having a high viscosity. The high viscosity of a silane modified polymer necessarily leads to a high viscosity in adhesive compositions comprising that silane modified polymer.

Prior compositions suffer from one or more issues of high viscosity, low adhesion, poor low temperature performance or low tensile strength. Thus, there is a need for improved silane modified polymers for use in adhesives. There is a continuing need to make a silane modified polymer that will not only provide enhanced adhesion to adhesive compositions but also have a lower viscosity so that those adhesive compositions have a viscosity that is practical for commercial application.

SUMMARY OF THE DISCLOSURE

This section provides a general summary of the disclosure and is not a comprehensive disclosure of its full scope or all features, aspects or objectives.

In general terms, this disclosure provides a silane modified terpolymer having improved tensile strength, adhesion strength, low temperature adhesion strength and a lower viscosity.

In one embodiment, the present disclosure is a silane modified terpolymer comprising: at least one polyether segment, the polyether segment comprising at least 70% by weight based on the total weight of the silane modified polymer; at least one segment selected from a polytetrahydrofuran segment or a polycarbonate segment; at least one polysiloxane segment; and at least one terminal amino silane group connected to the polymer via an isocyanate linkage.

In one embodiment, the polysiloxane segment has a molecular weight of 3200 daltons or less.

In one embodiment, the polytetrahydrofuran segment has a molecular weight of 2000 daltons or less.

In one embodiment, the polyether segment has a molecular weight of from about 1000 to about 30000 Dalton.

In one embodiment, the polyether segment is formed from ethylene oxide, propylene oxide, butylene oxide, epichlorohydrin or a mixture thereof.

In one embodiment, the polysiloxane segment is derived from one of a hydroxyl terminated polysiloxane or a carbinol polysiloxane having a molecular weight of 20,000 daltons or less, preferably 10,000 daltons or less and typically 3200 daltons or less.

In at least one embodiment the polysiloxane segment is derived from one of a hydroxyl terminated polysiloxane or a carbinol polysiloxane having a general formula of: HO—$(CH_2)_m$—$Si(CH_3)_2$—O—$[Si(CH_3)_2$—O$]_n$—$Si(CH_3)_2$—$(CH_2)_m$—OH wherein each "m" independently has a value of from 0 to 30, preferably 1 to 12 and "n" has a value of from about 30 to 50, such that the overall weight of the polysiloxane segment has a value of 20,000 daltons or less, preferably 10,000 daltons or less, more preferably 5,000 daltons or less and typically 3200 daltons or less.

In at least one embodiment the terminal amino silane groups have the general formula of:

$$H-N(R^2)_a(R^1-SiXYZ)_{2-a}$$

wherein:

a is 0 or 1.

$R^1$ is a divalent hydrocarbon residue having 1 to 12 carbon atoms and linking the N and Si atom.

X, Y, Z are, independently of one another, selected from the group consisting of a hydroxyl group, a $C_1$ to $C_{12}$ alkyl, or a $C_1$ to $C_{12}$ alkoxy group and at least one of X, Y or Z is the alkoxy group. Preferably, two of X, Y or Z are independently chosen alkoxy groups and more preferably all of X, Y or Z are independently chosen alkoxy groups.

$R^2$ is hydrogen or a univalent hydrocarbon residue having 1 to 12 carbon atoms.

In one embodiment, the disclosure is a moisture curable adhesive composition comprising: a silane modified terpolymer and optional additives. The additives can be selected from at least one of a plasticizer, an adhesion promotor, a filler, an UV stabilizer, or a mixture thereof.

In one embodiment, the disclosure is a method of forming a silane modified terpolymer comprising: providing a mixture of a polyether polyol; a polytetrahydrofuran polyol or a polycarbonate polyol; and a hydroxyl terminated polysiloxane or a carbinol polysiloxane. This mixture is reacted with an excess of polyisocyanate to form an isocyanate functional terpolymer intermediate. The isocyanate functional terpolymer intermediate is reacted with an amino silane to form an amino silane terminated terpolymer wherein the polyether polyol comprises at least 70% by weight based on the total weight of the silane modified terpolymer.

In one embodiment of the method the polyether polyol has a molecular weight of from 1000 to 30000.

In one embodiment of the method the polyether polyol is formed from ethylene oxide, propylene oxide, butylene oxide, epichlorohydrin or a mixture thereof.

In one embodiment of the method the hydroxyl terminated polysiloxane or carbinol polysiloxane has a general formula of:

$$HO-(CH_2)_m-Si(CH_3)_2-O-[Si(CH_3)_2-O]_n-Si(CH_3)_2-(CH_2)_m-OH;$$

wherein each "m" independently has a value of from 0 to 30, preferably 1 to 12 and "n" has a value of from about 10 to 50, preferably 30 to 50, such that the overall weight of the polysiloxane segment has a value of 20,000 daltons or less, preferably 10,000 daltons or less, more preferably 5,000 daltons or less and typically 3200 daltons or less.

In one embodiment, the polyisocyanate is a diisocyanate. The polyisocyanate is preferably 1-isocyanato-3,3,5-trimethyl-5-isocyanatomethylcyclohexane (isophorone diisocyanate, IPDI) as the polyisocyanate.

In one embodiment, the amino silane has the general formula of:

$$-N(R^2)_a(R^1-SiXYZ)_{2-a}$$

wherein:

a is 0 or 1. $R^1$ is a divalent hydrocarbon residue having 1 to 12 carbon atoms and linking the N and Si atom. X, Y, Z are, independently of one another, selected from the group consisting of a hydroxyl group, a $C_1$ to $C_{12}$ alkyl, or a $C_1$ to $C_{12}$ alkoxy group and at least one of X, Y or Z is the alkoxy group. Preferably, two of X, Y or Z are independently chosen alkoxy groups and more preferably all of X, Y or Z are independently chosen alkoxy groups.

$R^2$ is hydrogen or a divalent hydrocarbon residue having 1 to 12 carbon atoms.

These and other features and advantages of this disclosure will become more apparent to those skilled in the art from the detailed description of a preferred embodiment.

DETAILED DESCRIPTION OF A PREFERRED EMBODIMENT

The present disclosure is directed to a silane modified terpolymer finding use in curable adhesive compositions. The term "curable" is to be understood to mean that, under the influence of external conditions, in particular under the influence of moisture present in the environment and/or supplied for the purpose, the composition can pass from a relatively liquid state, optionally possessing plastic ductility, to an irreversible solid state.

The silane modified polymer of the present disclosure is surprising in that it provides a low viscosity, high adhesion, high tensile strength and advantageous low temperature adhesion compared to prior compositions. The presently disclosed silane modified polymer is in particular a terpolymer that is terminated with silyl hydrolysable groups. In particular, the presently disclosed silane modified polymer is a terpolymer comprising at least one segment or block derived from each of A) a polyether polyol, B) a polytetrahydrofuran polyol or a polycarbonate polyol, C) a hydroxyl terminated polysiloxane or a carbinol polysiloxane. Each of the segments is covalently bonded to an adjacent segment by a urethane linkage. The terpolymer includes one or more terminal silyl alkoxy groups. The disclosed terpolymer is created in a two-step process.

In the first step of the reaction an isocyanate terminated intermediate is formed by reacting a mixture comprising A) a polyether polyol, B) one of a polytetrahydrofuran polyol or a polycarbonate polyol, C) one of a hydroxyl terminated polysiloxane or a carbinol polysiloxane, and D) a stoichiometric excess amount of polyisocyanate in the presence of a catalyst. This produces the isocyanate terminated terpolymer intermediate comprising polyether segments, polytetrahydrofuran or polycarbonate segments and polysiloxane segments in the molecule. In the second step this isocyanate terminated terpolymer intermediate is reacted with a stoichiometric amount of amino silane, which reacts with the isocyanate functionality of the isocyanate terminated terpolymer intermediate and produces the finished silane terminated terpolymer with no free or reactive isocyanate functionalities left. The polyether segment A preferably comprises at least 70% by weight based on the total weight of the final silane terminated terpolymer, more preferably greater than 85% by weight. The polytetrahydrofuran or polycarbonate segment B preferably comprises from 0.1 to less than 20% by weight based on the total weight of the final silane terminated terpolymer, more preferably 5 to 15% by weight of the final silane terminated terpolymer. The polysiloxane segment C preferably comprises from 0.1 to less than 20% by weight based on the total weight of the final silane terminated terpolymer, more preferably 5 to 15% by weight of the final silane terminated terpolymer.

A "polyether polyol" is understood to be a polymer in which the organic repeating units comprise ether functionalities C—O—C in the main chain and which is terminated by hydroxyl groups. Polymers having lateral ether groups, such as cellulose ethers, starch ethers and vinyl ether polymers, as well as polyacetals such as polyoxymethylene (POM) are not included in the polyether polyols.

Unless otherwise specified molecular weight is number average molecular weight Mn. The number average molecular weight $M_n$ of the polyether polyol according to the present disclosure can be from 1000 to 30000 g/mol (daltons), preferably at least 4000 g/mol and more preferably at least 8000 g/mol and in particular 8000 to 20000. Particularly advantageous viscoelastic properties can be achieved if polyether polyols having a narrow molecular weight distribution, and thus low polydispersity, are used. These can be produced, for example, by so-called double metal cyanide catalysis (DMC catalysis) during their formation. Polyethers produced in this way are distinguished by a particularly narrow molecular weight distribution, by a high average molecular weight and by a very low number of double bonds at the ends of the polymer chains. Thus, it is preferred to utilize DMC catalyzed polyether polyols in the present disclosure. In the present disclosure, it is preferred that the maximum polydispersity $M_w/M_n$ of the polyether polyol is 1.5, particularly preferably 1.2. The number average molecular weight $M_n$, as well as the weight average molecular weight $M_w$, is generally determined by gel permeation chromatography (GPC, also known as SEC) at 23° C. using a styrene standard. This method is known to one skilled in the art. The polydispersity is derived from the average molecular weight $M_w$ and number average molecular weight $M_n$ and it is calculated as $PD=M_w/M_n$. The ratio $M_w/M_n$ (polydispersity) indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution, and thus the specific expression of properties associated with molecular weight, such as e.g., viscosity. In particular, therefore, in the context of the present disclosure, the polyether polyol has a polydispersity ($M_w/M_n$) of less than 1.5. As is known to one of skill in the art polyethers are formed from the reaction of an organic oxide with an initiator having at least two active hydrogen groups in the presence of a base catalyst. The polyether polyol is preferably a polyalkylene oxide, particularly preferred are polyether polyols formed from ethylene oxide, propylene oxide, butylene oxide, epichlorohydrin, or mixtures thereof. The polyether polyols to be used in accordance with the disclosure have an OH value of preferably about 56 to about 5 and, more preferably, of about 10. The terminal hydroxyl groups on the polyether polyol react with isocyanate groups of the polyisocyanate in the first step of the process.

The terpolymer is prepared from either a polytetrahydrofuran polyol or a polycarbonate polyol. The polytetrahydrofuran polyol preferably has a number average molecular weight of less than or equal to 2000 daltons. Typical examples include PolyTHF 250, 650, 1000, 1400, 1800 and 2000 grade, etc. from BASF Corp. The polycarbonate polyol preferably has a number average molecular weight of less than or equal to 3000 daltons. Its backbone can comprise pure carbonate segment. Its backbone can also comprise carbonate segment and other types such as ether, ester, etc. These segments can have linear or cyclic structure. Typical examples of polycarbonate polyol include Eternacoll PH-50, PH-100, PH-200 UM-90, UHC-50-100, UHC-50-200 etc. from UBE Corp; Oxymer M112 and C112 from Perstorp Corp; Desmophen C1100, C1200, C2100, C XP2716, Cardyon polycarbonate polyols such as Cardyon LC07 from Covestro Corp; Converge D251-20, D351-30, etc. from Aramco Performance Materials Corp. The terminal hydroxyl groups of the polytetrahydrofuran polyol or polycarbonate polyol provide reactivity with the diisocyanate in the first step.

The hydroxyl terminated siloxane or carbinol siloxane has a number average molecular weight of 20,000 daltons or less, preferably 10,000 daltons or less, more preferably 5,000 daltons or less and typically 3200 daltons or less. The preferred hydroxyl terminated siloxane is a hydroxyl terminated polydimethylsiloxane having the general formula HO—[Si(CH$_3$)$_2$—O]$_n$—H with a molecular weight of 20,000 daltons or less, preferably 10,000 daltons or less, more preferably 5,000 daltons or less and typically 3200 daltons or less. Also preferred are carbinol polysiloxanes having the general formula:

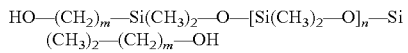

HO—(CH$_2$)$_m$—Si(CH$_3$)$_2$—O—[Si(CH$_3$)$_2$—O]$_n$—Si(CH$_3$)$_2$—(CH$_2$)$_m$—OH wherein each "m" independently has a value of from 0 to 30, preferably 1 to 12 and "n" has a value of from about 10 to 70, typically 20 to 50 and possibly 30 to 50, such that the overall weight of the polysiloxane has a value of about 20,000 daltons or less, preferably 10,000 daltons or less, more preferably 5,000 daltons or less and typically 3200 daltons or less. Useful examples include silicone polyethers such as Silsurf Di-1010, Di-2012 and Di-15I available from Siltech Corporation and carbinol modified silicones such as KF-6000, KF-6001, KF-6002, KGF-6003 available from ShinEtsu Chemical Corporation.

A "polyisocyanate" is understood to be a compound which has at least two isocyanate groups (—NCO). This compound does not have to be a polymer, and instead can be a monomer or oligomer. The polyisocyanates, component D) in step 1, suitable for preparing the terpolymer according to the invention include, by way of example: ethylene diisocyanate; 1,4-tetramethylene diisocyanate; 1,4-tetramethoxybutane diisocyanate; 1,6-hexamethylene diisocyanate (HDI); cyclobutane-1,3-diisocyanate; cyclohexane-1,3- and -1,4-diisocyanate; bis(2-isocyanatoethyl)fumarate; 1-isocyanato-3,3,5-trim ethyl-5-isocyanatomethylcyclohexane (isophorone diisocyanate, IPDI); 2,4- and 2,6-hexahydrotoluylene diisocyanate; hexahydro-1,3- or -1,4-phenylene diisocyanate; benzidine diisocyanate; naphthalene-1,5-diisocyanate; 1,6-diisocyanato-2,2,4-trimethylhexane; 1,6-diisocyanato-2,4,4-trimethylhexane; xylylene diisocyanate (XDI); tetramethylxylylene diisocyanate (TMXDI); 1,3- and 1,4-phenylene diisocyanate; 2,4- or 2,6-toluylene diisocyanate (TDI); 2,4'-diphenylmethane diisocyanate; 2,2'-diphenylmethane diisocyanate, 4,4'-diphenylmethane diisocyanate (MDI) and the isomeric mixtures thereof. Also suitable are partially or completely hydrogenated cycloalkyl derivatives of MDI, for example completely hydrogenated MDI (H12-MDI); alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bisisocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate; sulfur-containing diisocyanates such as those obtainable by reacting 2 moles diisocyanate with 1 mole thiodiglycol or dihydroxydihexyl sulfide; diisocyanates of dimer fatty acids, or mixtures of two or more of the named diisocyanates. The polyisocyanate is preferably a diisocyanate and more preferably selected from IPDI, TDI, MDI and combinations thereof.

There is a stoichiometric excess of NCO groups of the polyisocyanates with respect to the hydroxyl groups of the polyols in the intermediate reaction mixture. This stoichiometric excess must exist under the process conditions. The ratio of the number of NCO groups of the polyisocyanate(s) to the number of OH groups of the polyols is 1.5 to 3 and preferably 2 to 2.2.

The catalysts for carrying out the first step in the process are well known in the art and include, by way of example: alkyl tin carboxylates, alkyl tin oxides, alkyl tin mercaptides, dialkyl tin dilaurates, such as dibutyl tin oxide, dibutyltin dilaurate and dioctyltin dilaurate etc.; tertiary amine catalysts such as triethylenediamine (TEDA, also called DABCO, 1,4-diazabicyclo[2.2.2]octane), dimethylcyclohexylamine (DMCHA), dimethylethanolamine (DMEA). It may also include various non-tin organo-metallic catalysts such as Bi, Zr, Zn, Ti or other non-tin organo-metallic catalysts. The level of catalyst in the composition will depend on the type of catalyst used, but can range from about 0.001 wt. % to about 5 wt. %, advantageously from about 0.005 wt. % to about 3 wt. % and more advantageously from about 0.01 wt. % to about 0.5 wt. %, based on the total weight of the adhesive composition.

The intermediate product resulting from this first step is a mixture of isocyanate terminated terpolymer, lesser amounts of isocyanate terminated copolymers and possibly isocyanate terminated prepolymers. The terpolymer comprises three types of segments: polyether segments, polytetrahydrofuran or polycarbonate segments and polysiloxane or alkyl polysiloxane segments wherein each of the segments is covalently bonded to an adjacent segment by a urethane linkage. The copolymers comprise two types of segments: polyether segments covalently bonded to polytetrahydrofuran or polycarbonate segments by urethane linkages and polyether segments covalently bonded to polysiloxane or alkyl polysiloxane segments by urethane linkages. The intermediate product may also include isocyanate prepolymer reaction products of the polyisocyanate and one of the polyether polyol, the polytetrahydrofuran or polycarbonate polyol, or the hydroxyl terminated polysiloxane or a carbinol polysiloxane.

In the second step of the process the isocyanate terminations in the intermediate products are reacted with an amino silane to form terminal silane groups on the terpolymer. Suitable amino silanes have the general formula $$H-N(R^2)_a(R^1-SiXYZ)_{2-a}$$

wherein:

a is 0 or 1.

$R^1$ is a divalent hydrocarbon residue having 1 to 12 carbon atoms and linking the N and Si atom. X, Y, Z are, independently of one another, selected from the group consisting of a hydroxyl group, a $C_1$ to $C_{12}$ alkyl, or a $C_1$ to $C_{12}$ alkoxy group with the proviso that at least one of X, Y or Z is a hydrolyzable group, preferably an alkoxy group. Preferably, two of X, Y or Z are independently chosen alkoxy groups and more preferably all of X, Y or Z are independently chosen alkoxy groups.

$R^2$ is hydrogen or a divalent hydrocarbon residue having 1 to 12 carbon atoms. The amino silane is either a primary or a secondary amine and during the formation of the silane modified terpolymer the amino silane loses a hydrogen atom so the amino silane terminal group of the terpolymer comprises $-N(R^2)_a(R^1-SiXYZ)_{2-a}$.

As used herein, the term "hydrocarbon residue" is intended to refer to radicals or diradicals which are primarily composed of carbon and hydrogen atoms. Thus, the term encompasses aliphatic groups such as alkyl, alkenyl, and alkynyl groups; aromatic groups such as phenyl; and alicyclic groups, such as cycloalkyl and cycloalkenyl.

In some embodiments the amino silanes are monopodal having the general formula $H-N(R^2)_a(R^1-SiXYZ)_{2-a}$ wherein a is 1. Examples of some useful monopodal aminosilane compounds include 3-aminopropyltrimethoxysilane, 3-aminopropyltriethoxysilane, N-(2-aminoethyl-3-aminopropyl)trimethoxysilane, 3-aminopropylmethyldiethoxysilane, 4-amino-3,3-dimethylbutyltrimethoxysilane, N-(n-butyl)-3-aminopropyltriethoxysilane, N-(n-butyl)-3-aminopropylmethyldimethoxysilane, 1-butanamino-4-(dimethoxymethylsilyl)-2,2-dimethyl, (N-cyclohexylaminomethyl)triethoxysilane, (N-cyclohexylaminomethyl)-methyldiethoxysilane, (N-phenylaminoethyl)trimethoxysilane, (N-phenylaminomethyl)-methyldimethoxysilane, gamma-ureidopropyltrialkoxysilane and N-(3-(Trimethoxysilyl)propyl)butylamine (available as Dynasylan® 1189 from Evonik Corp). In some embodiments the amino silanes are bipodal having the general formula $H-N(R^2)_a(R^1-SiXYZ)_{2-a}$ wherein a is 0. Bipodal amino silanes can advantageously provide increased crosslinking of the silane terminated terpolymer compared to monopodal amino silanes. Some useful bipodal amino silanes include bis(gamma-trimethoxysilylpropyl)amine (Dynasylan 1124) and its ethoxy counterpart bis(gamma-triethoxysilylpropyl)amine (Dynasylan 1122, both available from Evonik Corp).

The preferred silane terminated terpolymer chain thus comprises at least two linking points at which the condensation of the polymers can be completed, splitting off the hydrolyzed residues in the presence of atmospheric moisture. In this way, regular and rapid crosslinkability is achieved so that bonds with good strength can be obtained. In addition, by means of the quantity and the structure of the X, Y and Z hydrolyzable groups—for example by using di- or trialkoxysilyl groups, methoxy groups or longer residues—the configuration of the network that can be controlled to be a long-chain system (thermoplastics) or a relatively wide-mesh three-dimensional network (elastomers) or a highly crosslinked system (thermosets) so that inter alia the elasticity, flexibility and heat resistance of the finished crosslinked terpolymer compositions can be influenced in this way. In general, the disclosed terpolymers comprising di- or trialkoxysilyl end groups have highly reactive linking points which permit rapid curing, high degrees of crosslinking and thus good final strengths. One advantage of dialkoxysilyl groups lies in the fact that, after curing, the corresponding compositions are more elastic, softer and more flexible than systems comprising trialkoxysilyl groups. They are therefore suitable in particular for use as sealants. In addition, they split off little alcohol during curing and are therefore of particular interest when the quantity of alcohol released is to be reduced. With trialkoxysilyl groups, on the other hand, a higher degree of crosslinking can be achieved, which is particularly advantageous if a harder, stronger material is desired after curing. In addition, trialkoxysilyl groups are more reactive and therefore crosslink more rapidly, thus reducing the quantity of catalyst required, and they have lower "cold flow"—the dimensional stability of a corresponding adhesive under the influence of force and possibly temperature.

The general process for forming the isocyanate-terminated terpolymer intermediate and the finished terpolymer is as follows. A mixture comprising a polyether polyol; a polytetrahydrofuran polyol or a polycarbonate polyol; and a hydroxyl terminated polysiloxane or a carbinol siloxane is provided and placed under vacuum at an elevated temperature (for example, 170° F.) until the moisture level is less than 300 parts per million. Vacuum is replaced with dry nitrogen and catalyst can optionally be added to the mixture. The mixture is reacted with a polyisocyanate for 30 minutes to 3 hours under vacuum and at an elevated temperature to form a terpolymer intermediate. The terpolymer intermediate is reacted with a stoichiometric amount of amino silane to form the amino silane terminated terpolymer. Other additives can optionally be added to the terpolymer to form a composition.

When the terpolymer according to the present disclosure is used as a part of a curable adhesive composition the composition may comprise, in addition to the terpolymer, further ingredients which can contribute to the expression of desired properties. The curable adhesive composition can optionally comprise one or more plasticizers to adjust the elastic properties and to improve the processability of the composition. A plasticizer is understood to be a substance which reduces the viscosity of the composition and thus makes processing easier, and in addition improves flexibility and extensibility of the compositions. The plasticizer may be selected from a fatty acid ester, a dicarboxylic acid ester except cyclohexanedicarboxylic acid dialkyl ester, an ester of epoxidized fatty acids or fatty acids carrying OH groups, a fat, a glycolic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer, a chlorinated paraffin and mixtures of two or more thereof. By the careful selection of one of plasticizer or of a specific combination of plasticizers, further advantageous properties of the composition according to the disclosure, for example gelling properties of the polymers, low-temperature elasticity or low-temperature resistance or antistatic properties, can be achieved.

Among the polyether plasticizers, preferably end-capped polyethylene glycols are used, for example polyethylene or polypropylene glycol di-$C_{1-4}$-alkyl ethers, in particular the dimethyl or diethyl ethers of diethylene glycol or dipropylene glycol, and mixtures of two or more thereof. Also, suitable as plasticizers are, for example, esters of abietic acid, butyric acid ester, acetic acid ester, propionic acid ester, thiobutyric acid ester, citric acid ester and esters based on nitrocellulose and polyvinyl acetate, as well as mixtures of two or more thereof. Also suitable are, for example, the asymmetrical esters of adipic acid monooctyl ester with 2-ethylhexanol (Edenol DOA, Cognis Deutschland GmbH, Düsseldorf). In addition, the pure or mixed ethers of monofunctional, linear or branched $C_{4-16}$ alcohols or mixtures of two or more different ethers of such alcohols are suitable as plasticizers, for example dioctyl ether (available as Cetiol OE, Cognis Deutschland GmbH, Düsseldorf). Likewise suitable as plasticizers within the framework of the present disclosure are diurethanes, which can be produced e.g. by reaction of diols having OH end groups with monofunctional isocyanates, by selecting the stoichiometry so that substantially all free OH groups react fully. Any excess isocyanate can then be removed from the reaction mixture, e.g. by distillation. Another method for producing diurethanes consists in the reaction of monofunctional alcohols with diisocyanates, wherein as far as possible all NCO groups react fully. If used, the total quantity of plasticizer(s) in curable compositions according to the invention is from 0 wt. % to 30 wt. %, preferably 5 wt. % to 25 wt. % and particularly preferably 10 wt. % to 20 wt. %, based in each case on the total weight of the curable composition.

The curable adhesive composition according to the disclosure can optionally comprise a silane resin. Useful silane resins typically have a molecular weight of about 500 or less and reactive silylalkoxy and/or reactive aminosilane moieties. Some exemplary silane resins include 3-aminopropyltrimethoxysilane, 3-aminopropyltriethoxysilane, N-(2-aminoethyl-3-aminopropyl)trimethoxysilane, 3-aminopropylmethyldiethoxysilane, 4-amino-3,3-dimethylbutyltrimethoxysilane, N-(n-butyl)-3-aminopropyltrimethoxysilane, 1-butanamino-4-(dimethoxymethylsilyl)-2,2-dimethyl, Bis(trimethoxysilylpropyl)amine, Bis(triethoxysilylpropyl)amine, (N-cyclohexylaminomethyl)triethoxysilane, (N-cyclohexylaminomethyl)-methyldiethoxysilane, (N-phenylaminoethyl)trimethoxysilane, (N-phenylaminomethyl)-methyldimethoxysilane or gamma-ureidopropyltrialkoxysilane. Some exemplary oligomeric silane resins include Sivo 203, Sivo 210, Sivo 214 from Evonik Corp, etc. The curable adhesive composition can comprise about 0 wt. % to 50 wt. %, preferably 0 wt. % to 20% wt. %, more preferably 0.2 wt. % to 5 wt. % of silane resin based on the total weight of the curable adhesive composition. Depending upon the different adhesive compositions, the silane resins may function as adhesion promoters and/or coupling agents. Other useful adhesion promoters include epoxy silanes.

The curable adhesive composition according to the disclosure can optionally comprise a siloxane resin. Useful siloxane resin typically have a molecular weight of about 1,000 or less, at least one —Si—O—Si— bond and silylalkoxy moieties. Preferably, the siloxane resin also includes one or more aromatic ring moieties in the structure. One useful siloxane resin is diphenyltetramethoxydisiloxane. The curable adhesive composition can comprise about 0 wt. % to 50 wt. %, preferably 0 wt. % to 20% wt. %, of siloxane resin based on the total weight of the curable adhesive composition.

The adhesive composition according to the disclosure can optionally comprise one or more filler(s). Some useful fillers include chalk, powdered limestone, precipitated and/or pyrogenic silica, zeolites, bentonites, calcium carbonate, magnesium carbonate, kieselguhr, alumina, clay, tallow, titanium oxide, iron oxide, zinc oxide, sand, quartz, flint, mica, powdered glass and other ground minerals. Organic fillers can also be used. Some useful organic fillers include carbon black, graphite, wood fibers, wood flour, sawdust, cellulose, cotton, pulp, wood chips, chopped straw, chaff, ground walnut shells and other short-cut organic fibers. Other short fibers such as glass fibers, glass filament, polyacrylonitrile, carbon fibers, Kevlar fibers or polyethylene fibers can also be useful as filler. Aluminum powder is also suitable as a filler. Hollow spheres with a mineral shell or a plastic shell are suitable as fillers. These can be e.g. hollow glass spheres which are commercially available with the trade names Glass Bubbles®. Plastic-based hollow spheres are commercially available, e.g. with the names Expancel® or Dualite®. These have a diameter of 1 mm or less, preferably of 500 μm or less. For some applications, fillers which make the preparations thixotropic are preferred. These fillers are also described as rheological auxiliaries, for example hydrogenated castor oil, fatty acid amides or swellable plastics such as PVC. The filler(s) are preferably used in a quantity of 0 wt. % to 80 wt. %, more preferably 20 wt. % to 60 wt. %, for example 25 wt. % to 55 wt. %, in particular 35 to 50 wt. %, based on the total weight of the composition.

The adhesive composition according to the present disclosure can optionally comprise UV stabilizers. Some useful UV stabilizers are the hindered amine light stabilizers (HALS). A UV stabilizer which carries a silyl group allowing it to be incorporated into the end product during crosslinking or curing can also be used. Furthermore, benzotriazoles, benzophenones, benzoates, cyanoacrylates, acrylates, sterically hindered phenols, phosphorus and/or sulfur can also be useful. The proportion of UV stabilizer(s) in the composition is about 0 wt. % to 2 wt. %, in particular 0 wt. % to 1 wt. %, based on the total weight of the composition.

It can be useful to stabilize the adhesive composition against premature curing caused by moisture penetration in order to increase the shelf life even more. This can be achieved by the use of moisture scavenger or drying agents. The adhesive composition can optionally comprise moisture scavenger or drying agent. Useful drying agents are all compounds that react with water to form a group that is inert towards the reactive groups present in the composition while undergoing only small changes in their molecular weight. Naturally, the reactivity of the drying agents towards moisture that has penetrated into the composition must be higher than the reactivity of the amino silane end groups of the terpolymer in the composition. If used, the proportion of moisture scavenger or drying agent in the composition is about 0 wt. % to 10 wt. % and in particular 0 wt. % to 2 wt. %, based on the total weight of the composition.

Other additives useful in the disclosed composition in certain applications include air release agent; fungicide; flame retardant and combinations thereof. The total level of these additives will vary depending on amount of each particular additive needed to provide the adhesive composition with desired properties. The level of additives can be from 0 wt. % to 80 wt. %, based on the total weight of the composition.

The curable adhesive composition can be prepared by mixing the non-reactive components until homogeneously blended. This is followed by mixing the reactive components to the blended non-reactive components. Mixing should be done at an elevated temperature and in a controlled atmosphere to exclude moisture and prevent crosslinking and curing of the silane modified copolymer and/or composition. The adhesive compositions in the uncured state will be pasty solids.

The adhesive compositions are useful for bonding articles composed of a wide variety of substrates (materials), including but not limited to wood, metal, polymeric plastics, glass, textiles and composites. The adhesive compositions can be used to bond articles together by applying the adhesive composition, typically at room temperature, to a first article substrate; and bringing a second article substrate in contact with the adhesive composition applied to the first article. After application of the second article the adhesive bond can be exposed to conditions suitable to crosslink the composition and cure it to an irreversible solid form. As used herein, "irreversible solid form" means a solid form wherein the silane terminated terpolymer composition has crosslinked to produce a cured, thermoset, insoluble material. Typically, the terpolymer and adhesive composition comprising the terpolymer cure after exposure to moisture and not by exposure to other conditions such as radiation. Conditions of 23° C. and 50% humidity for 24 hours or more, for example up to 1 week or longer, are typically suitable to cure the disclosed composition.

Testing Methods

The following testing methods were utilized to test the polymers and compositions as discussed herein. Viscosity is measured using a Brookfield Thermosel viscometer, model RVDV-I Prime with Spindle #27. The sample temperature is maintained at 23° C. The viscosity value is reported in centipoise per second (cps).

Film preparation—A mixture of 25 g terpolymer, 0.25 g N-(2-Aminoethyl)-3-aminopropyltrimethoxysilane (Geniosol GF91 available from Wacker Chemie AG) and 0.08 g dioctyltin dilaurate (DOTL) catalyst was prepared. The mixture is cast in a template to form a film. Film thickness was in the range of 0.5 mm to 3.0 mm. This film is cured for 7 days at 23° C. and 50% humidity or until fully cured.

Skin Over Time (SOT)—Skin over time is tested by probing a film as it cures to establish the time at which the film becomes non-tacky to the probe.

Tensile testing of neat cured film is done according to ASTM D-638. Dogbone samples are cut from a cured film according to ASTM D-638, and tested in a tensile testing machine (Sintech 1D). Tensile modulus and Strain % at break for the sample are recorded. The higher the tensile modulus the higher the strength of that cured composition. The higher the Strain % the higher the flexibility and elongation of that cured composition.

Adhesion test—A curable adhesive composition is prepared according to the following formula.

|  | Wt(g) |
| --- | --- |
| terpolymer | 32 |
| diphenyltetramethoxydisiloxane | 14 |
| vinyltrimethoxysilane | 2.6 |
| 3-aminopropyltrimethoxysilane | 2 |
| titanium dioxide | 15 |
| thixotrope[1] | 2 |
| calcium carbonate powder | 32.6 |
| dioctyltin dilaurate (DOTL) | 0.2 |

[1]Rilanit Micro available from BASF

The curable adhesive composition is applied, typically at room temperature, to a first test substrate at a thickness of about 1/16 inch (about 1.6 mm); and a second test substrate is placed in contact with the adhesive composition applied to the first substrate. After application of the second substrate the adhesive bond is kept under constant temperature (23° C.) and humidity (50%) conditions to cure for 24 hours to an irreversible solid form. The cured bonds are tested by a tensile testing machine, for example by Instron, in lap shear mode at pulling speed of 0.5" per min until failure and the lap shear bond strength are recorded in PSI.

Adhesion test on wood—The adhesive is applied to Maple lap shear specimens that measure 1 inch by 4 inches. The application area was 1 inch by 1 inch, and the adhesive is applied at a thickness of about 1/16 inch (about 1.6 mm) to one of the specimens and then the second specimen is pressed on top of the adhesive and first specimen and the overlapped lap shear specimens are clipped together. This process was repeated two more times to make three total test samples. These bonds were then allowed to cure for 24 hrs in a 50% humidity, 22° C. room. Testing of the lap shear bonds for adhesion strength was then conducted on an Instron 5582, measuring the maximum tensile load required to break the bond in psi.

EXAMPLES

Generally, the comparative co-polymers and the examples were prepared in two steps. In a first step the desired polyols were dried and reacted with an isocyanate to form an intermediate isocyanate functional prepolymer. In the second step the isocyanate functional prepolymer was reacted with an amino silane to produce the final material.

Control polymer A was prepared as follows. In the first step 384.02 g (33.88 mmol) of polypropylene ether polyol (Acclaim® 12200N, hydroxyl value=9.90) was dried under vacuum. Under a nitrogen atmosphere, 0.1 g of dioctyltin dilaurate catalyst (TIB Kat 216) was added with stirring. Then, 15.19 g (68.33 mmol) of the polyisocyanate IPDI was added (NCO/OH ratio=2.02) with stirring. The mixture was left for one hour at 80-90° C. The conversion was accomplished with NCO monitoring, and as soon as the theoretical NCO value of the prepolymer had been reached titrimetrically (% NCO<0.75), 17.09 g (72.60 mmol) of the monopodal amino silane N-(3-(Trimethoxysilyl)propyl)butylamine (Dynasylan® 1189) was added with stirring and the mixture was left for half an hour at 80-90° C. (% NCO=0.00). A linear polymer was obtained. Additives were added to the reactor while stirring for 10-30 minutes at 80° C., the resulting polymer was stored in a moisture-proof glass vessel under a nitrogen atmosphere.

Comparative co-polymer B comprising a polyether segment and a polytetrahydrofuran segment was prepared as follows. 222.2 g of the higher molecular weight polyether polyol (Acclaim 12200) and 27.7 g of PolyTHF 1000 were combined and dried under vacuum. Under a nitrogen atmosphere 0.019 g of Reaxis 216 catalyst was added with stirring, followed by 21.31 g of IPDI. The mixture was left to react for about one hour at 80° C. 30.1 g of the bipodal aminosilane Bis(trimethoxysilypropyl)amine was added to the stirred and heated mixture and reacted until the % NCO was about 0. The resulting copolymer was stored in a moisture-proof glass vessel under a nitrogen atmosphere to prevent moisture curing.

Comparative co-polymer C comprising a polyether segment and a polytetrahydrofuran segment was prepared as for co-polymer B except a 1400 Mn polyTHF polyol was used in place of the 1000 Mn PolyTHF polyol.

Comparative co-polymer D comprising a polyether segment and a polysiloxane segment was prepared as follows. 222.2 g of the higher molecular weight polyether polyol (Acclaim 12200) and 27.7 g of Silsurf® Di-1010 were combined and dried under vacuum. Under a nitrogen atmosphere 0.019 g of Reaxis 216 catalyst was added with stirring, followed by 14.14 g of IPDI. The mixture was left to react for about one hour at 80° C. 19.85 g of the bipodal aminosilane Bis(trimethoxysilypropyl)amine was added to the stirred and heated mixture and reacted until the % NCO was about 0. The resulting copolymer was stored in a moisture-proof glass vessel under a nitrogen atmosphere to prevent moisture curing.

Comparative co-polymer E comprising a polyether segment and a polysiloxane segment was prepared as follows. 222.2 g of the higher molecular weight polyether polyol (Acclaim 12200) and 27.7 g of KF6000 were combined and dried under vacuum. Under a nitrogen atmosphere 0.019 g of Reaxis 216 catalyst was added with stirring, followed by 21.77 g of IPDI. The mixture was left to react for about one hour at 80° C. 32.24 g of the bipodal aminosilane Bis(trimethoxysilypropyl)amine was added to the stirred and heated mixture and reacted until the % NCO was about 0. The resulting copolymer was stored in a moisture-proof glass vessel under a nitrogen atmosphere to prevent moisture curing.

Comparative co-polymer F comprising two different polyether segments was prepared as follows. 222.2 g of the higher molecular weight polyether polyol (Acclaim 12200) and 27.7 g of PPG1000 were combined and dried under vacuum. Under a nitrogen atmosphere 0.019 g of Reaxis 216 catalyst was added with stirring, followed by 21.44 g of IPDI. The mixture was left to react for about one hour at 80° C. 33.45 g of the bipodal aminosilane Bis(trimethoxysilypropyl)amine was added to the stirred and heated mixture and reacted until the % NCO was about 0. The resulting copolymer was stored in a moisture-proof glass vessel under a nitrogen atmosphere to prevent moisture curing.

Examples 1-8 were terpolymers comprising polyether, polyTHF and polysiloxane segments derived from the starting materials shown in Table 1 to form an isocyanate functional terpolymer intermediate. Examples 1-8 were all terminated by reacting the bipodal amino silane Dynasylan 1124 with the isocyanate end groups of the terpolymer intermediate. The process for formation of example 1 was as follows: 222.2 g of the higher molecular weight polyether polyol (Acclaim 12200) and 13.86 g of PolyTHF 1000 and 13.86 g of Silsurf DI-1010 were combined and dried under vacuum. Under a nitrogen atmosphere 0.019 g of Reaxis 216 catalyst was added with stirring, followed by 18.66 g of IPDI. The mixture was left to react for about one hour at 80° C. 26.18 g of the aminosilane Bis(trimethoxysilypropyl)amine was added to the stirred and heated mixture and reacted until the % NCO was about 0. The resulting copolymer was stored in a moisture-proof glass vessel under a nitrogen atmosphere to prevent moisture curing. The process for formation of examples 2-8 is similar except the starting components are adjusted according to Table 1. The weights of PolyTHF and Siloxane were adjusted in each Example to maintain the 16:1 polyol ratio. The amount of IPDI was adjusted to maintain a NCO:OH ratio of 2 and the amount of bis(trimethoxysilypropyl)amine was adjusted to achieve an isocyanate content of about 0.

TABLE 1

| Example | isocyanate | Polyether polyol | PolyTHF (Mn) | Siloxane (Mn) | polyol ratio (parts by weight) |
|---|---|---|---|---|---|
| Comparative copolymer A | IPDI | Acclaim ® 12200N | none | none | single polyol |
| Comparative copolymer B | IPDI | Acclaim ® 12200N | PolyTHF (1000) | none | 8:1 |
| Comparative | IPDI | Acclaim ® | PolyTHF (1400) | none | 8:1 |

TABLE 1-continued

| Example | isocyanate | Polyether polyol | PolyTHF (Mn) | Siloxane (Mn) | polyol ratio (parts by weight) |
|---|---|---|---|---|---|
| copolymer C | | 12200N | | | |
| Comparative copolymer D | IPDI | Acclaim® 12200N | none | Silsurf® Di 1010 (1800) | 8:1 |
| Comparative copolymer E | IPDI | Acclaim® 12200N | none | KF6000 (974) | 8:1 |
| Comparative copolymer F | IPDI | Acclaim® 12200N + PPG1000 | none | none | 8:1 |
| Ex. 1 | IPDI | Acclaim® 12200N | PolyTHF (1000) | Silsurf® Di 1010 (1800) | 16:1:1 |
| Ex. 2 | IPDI | Acclaim® 12200N | PolyTHF (1000) | Silsurf®-15-I (2400) | 16:1:1 |
| Ex. 3 | IPDI | Acclaim® 12200N | PolyTHF (1000) | Silsurf® Di 2012 (2900) | 16:1:1 |
| Ex. 4 | IPDI | Acclaim® 12200N | PolyTHF (650) | Silsurf® Di 1010 (1800) | 16:1:1 |
| Ex. 5 | IPDI | Acclaim® 12200N | PolyTHF (1000) | Silsurf® Di 1010 (1800) | 16:1:1 |
| Ex. 6 | IPDI | Acclaim® 12200N | PolyTHF (1400) | Silsurf® Di 1010 (1800) | 16:1:1 |
| Ex. 7 | IPDI | Acclaim® 12200N | PolyTHF (1000) | KF6000 (974) | 16:1:1 |
| Ex. 8 | IPDI | Acclaim® 12200N | PolyTHF (1400) | KF6000 (974) | 16:1:1 |

Control polymer A, the comparative co-polymers and examples 1-8 were tested for a variety of characteristics. Results are shown below in Table 2.

TABLE 2

| Sample | Viscosity (cps) | SOT (min) | Modulus (psi) | Maximum Strain % | Adhesion (N/mm$^2$) |
|---|---|---|---|---|---|
| Control polymer A | 50,000 | 56 | 164 | 139 | 6.2 |
| Comp. co-polymer B | 57,000 | 42 | 306 | 115 | 6.5 |
| Comp. co-polymer C | 64250 | 27 | 310 | 87 | 7.4 |
| Ex. 1 | 43,000 | 26 | 256 | 101 | 6.6 |
| Ex. 2 | 43,100 | 21 | 230 | 97 | 5.8 |
| Ex. 3 | 54,750 | 51 | 214 | 106 | 5.9 |
| Ex. 4 | 39,100 | 29 | 287 | 126 | 4.9 |
| Ex. 5 | 43,000 | 26 | 256 | 101 | 6.6 |
| Ex. 6 | 47,100 | 26 | 237 | 111 | 6.5 |
| Ex. 7 | 44500 | 18 | 302 | 103 | 7.0 |
| Ex. 8 | 49000 | 29 | 294 | 112 | 6.7 |

The data shows that the comparative co-polymer B, having both polyether and polytetrahydrofuran segments improved the tensile strength and the adhesive strength compared to control polymer A. However comparative co-polymer B also had a significantly higher viscosity which is not useful.

Comparative co-polymer C, having both polyether and polysiloxane segments had a lower viscosity than control polymer A. However comparative co-polymer C also had significantly reduced adhesive strength and tensile strength compared to control polymer A which is not desirable.

Surprisingly, examples 1-2 and 4-6 generally provided both usefully lowered viscosity and surprisingly increased tensile strength compared to control polymer A. Examples 1 and 5-8 had increased adhesion (adhesive strength) compared to control polymer A. Example 1, 2 and 3 are terpolymers with same Acclaim polyether polyol and Poly-THF segment, but different PDMS segment with increasing MW from 1800 to 2400 to 2900 Dalton. As the MW of PDMS increases to 2900 Dalton, the terpolymer example 3 will have increased viscosity and decreased adhesion in comparison to Example 1, making it undesirable to use. The lower adhesive strength of example 4 is believed to be due to the lower molecular weight of the polytetrahydrofuran that was used.

Examples 9 and 10 were each made using IPDI, Acclaim 12200N, PolyTHF (1000), Silsurf Di 1010 (MW1800) and bipodal aminosilane Bis(trimethoxysilypropyl)amine using the above procedure for examples 2-8 at polyol ratios of 16:1:2 and 16:2:1 respectively. There appears to be an optimized ratio between the components of the terpolymer. Example 5 (Acclaim-PTHF1000-Silsurf Di 1010 having a polyol ratio 16:1:1) gave the lowest viscosity and highest adhesion compared to Examples 9 and 10 with ratios of 16:1:2 and 16:2:1.

TABLE 3

| example | polyol ratio parts by weight | Visc. (cps) | SOT (min) | Modulus (psi) | Maximum Strain % | Adhesion Maple (24 h) |
|---|---|---|---|---|---|---|
| Ex. 5 | 16:1:1 | 43000 | 26 | 256 | 101 | 6.6 |
| Ex. 9 | 16:1:2 | 43700 | 24 | 248 | 124 | 5.1 |
| Ex. 10 | 16:2:1 | 49200 | 37 | 351 | 129 | 5.8 |

Comparative co-polymer D comprising a polyether segment and a polysiloxane segment was prepared as described above.

Comparative co-polymer G comprising a polyether segment and a polycarbonate segment. Co-polymer G was prepared as follows. 222.2 g of the higher molecular weight polyether polyol (Acclaim 12200) and 27.7 g of polycarbonate polyol with a molecular weight of 900 daltons (Eternacoll UM-90) were combined and dried under vacuum. Under a nitrogen atmosphere 0.019 g of Reaxis 216 catalyst was added with stirring, followed by 22.83 g of IPDI. The mixture was left to react for about one hour at 80° C. 35.58 g of the bipodal aminosilane bis(trimethoxysilylpropyl)amine was added to the stirred and heated mixture and reacted until the % NCO was about 0. The resulting copolymer was stored in a moisture-proof glass vessel under a nitrogen atmosphere to prevent moisture curing.

Example 11 is a terpolymer comprising a polyether segment, a polycarbonate segment and a polysiloxane segment. Example 11 was prepared as follows. 222.2 g of higher molecular weight polyether polyol (Acclaim 12200) and 18.48 g of Eternacoll UM-90 and 9.24 g of Silsurf DI-1010 were combined and dried under vacuum. Under a nitrogen atmosphere 0.019 g of Reaxis 216 catalyst was added with stirring, followed by 22.48 g of IPDI. The mixture was left to react for about one hour at 80° C. 35.05 g of the bipodal aminosilane bis(trimethoxysilylpropyl)amine (Dynasylan 1124) was added to the stirred and heated mixture and reacted until the % NCO was about 0. The resulting copolymer was stored in a moisture-proof glass vessel under a nitrogen atmosphere to prevent moisture curing.

TABLE 4

| Example | isocyanate | polyether polyol (Mn) | polycarbonate polyol (Mn) | polysiloxane polyol (Mn) | polyol ratio (parts by weight) |
|---|---|---|---|---|---|
| Comparative copolymer D | IPDI | Acclaim ® 12200N (11220) | none | Silsurf ® Di 1010 (1800) | 8:1 |
| Comparative copolymer G | IPDI | Acclaim ® 12200N | Eternacoll UM-90 (900) | none | 8:1 |
| Ex. 11 | IPDI | Acclaim ® 12200N | Eternacoll UM-90 (900) | Silsurf ® Di 1010 (1800) | 16:1.3:0.7 |

TABLE 5

| Example | polyol ratio (parts by weight) | Visc. (cps) | SOT (min) | Modulus (psi) | Maximum Strain % | Adhesion Maple (24 h) |
|---|---|---|---|---|---|---|
| Comparative copolymer D | 8:1 | 38900 | 40 | 191 | 96 | 4.9 |
| Comparative copolymer G | 8:1 | 99250 | 16 | 294 | 118 | 7.6 |
| Ex. 11 | 16:1.3:0.7 | 58400 | 17 | 272 | 115 | 6.5 |

Comparative co-polymer D, having both polyether and polysiloxane segments, but no polycarbonate segment, had a lower viscosity than control polymer A or Example 11. However comparative co-polymer D also had significantly reduced adhesive strength and tensile strength compared to control polymer A or Example 11, which is not desirable.

Comparative co-polymer G, having both polyether and polycarbonate segments, but no polysiloxane segment, improved the tensile strength and the adhesive strength compared to control polymer A or Example 11. However comparative co-polymer G also had a significantly higher viscosity that either control polymer A or Example 11, which is not useful.

Surprisingly, Example 11 which is a terpolymer having polyether, polycarbonate and polysiloxane segments generally provided both lowered viscosity, increased tensile strength and similar or increased adhesive strength compared to control polymer A.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

We claim:

1. A moisture curable, silane modified terpolymer comprising:
   at least one polyether segment; at least one segment selected from polytetrahydrofuran or polycarbonate; and at least one polysiloxane segment, each of the segments covalently bonded to an adjacent segment by a urethane linkage; and
   at least one terminal silyl hydrolysable group connected to the polymer via a linking group derived from an isocyanate containing compound, wherein each terminal silyl hydrolysable group comprises one to three hydrolysable groups.

2. A silane modified terpolymer as recited in claim 1 wherein the polyether segment comprises at least 70% by weight based on the total weight of the silane modified polymer.

3. A silane modified terpolymer as recited in claim 1 wherein said polyether segment has a molecular weight of from 1000 to 30000.

4. A silane modified terpolymer as recited in claim 1 wherein said polyether segment is formed from ethylene oxide, propylene oxide, butylene oxide, an epichlorohydrin residue or a mixture thereof.

5. A silane modified terpolymer as recited in claim 1 wherein the polytetrahydrofuran segment has a molecular weight of 2000 daltons or less and the polycarbonate segment has a MW of 2000 dalton or less.

6. A silane modified terpolymer as recited in claim 1 wherein said polysiloxane segment has a molecular weight of 20,000 daltons or less.

7. A silane modified terpolymer as recited in claim 1 wherein said polysiloxane segment has a general formula of:

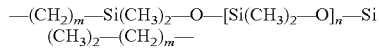
—$(CH_2)_m$—$Si(CH_3)_2$—O—$[Si(CH_3)_2$—$O]_n$—Si$(CH_3)_2$—$(CH_2)_m$— wherein "m" has a value of from 0 to 30 and "n" has a value of from 30 to 50, such that the overall weight of the polysiloxane segment has a value of 5,000 daltons or less.

8. A silane modified terpolymer as recited in claim 1 comprising a segment including polycarbonate and no polytetrahydrofuran.

9. A silane modified terpolymer as recited in claim 1 wherein said urethane linkages are derived from 1-isocyanato-3,3,5-trimethyl-5-isocyanatomethylcyclohexane (isophorone diisocyanate, IPDI).

10. A silane modified terpolymer as recited in claim 1 wherein said terminal silyl hydrolysable groups have the general formula of:

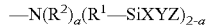
—$N(R^2)_a(R^1$—$SiXYZ)_{2-a}$ wherein:
a is 0 or 1;
$R^1$ is a divalent hydrocarbyl group having 1 to 12 carbon atoms and linking the N and Si atom;
X, Y, Z are, independently of one another, selected from the group consisting of a hydroxyl, a $C_1$ to $C_{12}$ alkyl, or a $C_1$ to $C_{12}$ alkoxy and at least one of X, Y or Z is the alkoxy group; and
$R^2$ is hydrogen or a hydrocarbon residue having 1 to 12 carbon atoms.

11. A silane modified terpolymer as recited in claim 1 wherein the hydrolysable groups are alkoxy groups.

12. A silane modified terpolymer as recited in claim 1 wherein the hydrolysable groups may be the same or different.

13. Cured reaction products of the silane modified terpolymer of claim 1.

14. A silane modified terpolymer comprising:
   the reaction products of an intermediate terpolymer terminated with isocyanate groups and an amino silane;
   wherein said intermediate terpolymer terminated with isocyanate groups comprises the reaction products of a mixture including polyether polyol; a polytetrahydrofuran having a molecular weight of 2000 daltons or less or a polycarbonate polyol having a molecular weight of 3000 daltons or less, a hydroxyl terminated polysiloxane or a carbinol siloxane having a molecular weight of 20,000 daltons or less, and an excess of diisocyanate.

15. The silane modified terpolymer of claim 14; comprising at least 70% by weight of polyether segments; from 0.1% to less than 20% by weight of polytetrahydrofuran or polycarbonate segments; and from 0.1% to less than 20% by weight of polysiloxane segments; by weight of the terpolymer.

16. A silane modified terpolymer as recited in claim 14 wherein said hydroxyl terminated polysiloxane has a general formula of:

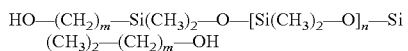
HO—$(CH_2)_m$—$Si(CH_3)_2$—O—$[Si(CH_3)_2$—$O]_n$—Si$(CH_3)_2$—$(CH_2)_m$—OH wherein "m" has a value of from 0 to 30 and "n" has a value of from 30 to 50, such that the overall weight of the polysiloxane segment has a value of 5,000 daltons or less.

17. An adhesive composition comprising the silane modified terpolymer of claim 14.

18. Cured reaction products of the silane modified terpolymer of claim 14.

19. A method of forming a silane modified terpolymer comprising:
   providing a mixture comprising at least 70% by weight polyether polyol, about 0.1% to 20% by weight of polytetrahydrofuran polyol or a polycarbonate polyol, and about 0.1% to 20% by weight of a hydroxyl terminated polysiloxane or a carbinol polysiloxane;
   reacting the mixture with an excess of equivalents of a diisocyanate to form an isocyanate functional terpolymer intermediate; and
   reacting the isocyanate functional terpolymer intermediate with an amino silane to form the silane modified terpolymer, wherein the polyether polyol comprises at least 70% by weight based on the total weight of the silane modified terpolymer.

20. The method of forming a silane modified terpolymer as recited in claim 19 wherein the polyisocyanate is selected from the group consisting of 1-isocyanato-3,3,5-trimethyl-5-isocyanatomethylcyclohexane (IPDI), toluylene diisocyanate (TDI), diphenylmethane diisocyanate (MDI) and combinations thereof.

* * * * *